United States Patent
Magri et al.

(10) Patent No.: US 10,075,256 B2
(45) Date of Patent: Sep. 11, 2018

(54) METHOD AND APPARATUS FOR SUPERCHANNEL TUNING

(71) Applicant: Telefonaktiebolaget L M Ericsson (publ), Stockholm (SE)

(72) Inventors: Roberto Magri, Pisa (IT); Fabio Cavaliere, Pisa (IT)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 14/911,136

(22) PCT Filed: Aug. 16, 2013

(86) PCT No.: PCT/EP2013/067181
§ 371 (c)(1),
(2) Date: Feb. 9, 2016

(87) PCT Pub. No.: WO2015/022034
PCT Pub. Date: Feb. 19, 2015

(65) Prior Publication Data
US 2016/0191195 A1    Jun. 30, 2016

(51) Int. Cl.
*H04J 14/02* (2006.01)
*H04B 10/572* (2013.01)
*H04L 5/00* (2006.01)
*H04L 27/26* (2006.01)
*H04B 10/61* (2013.01)

(52) U.S. Cl.
CPC ........ *H04J 14/0298* (2013.01); *H04B 10/572* (2013.01); *H04B 10/616* (2013.01); *H04J 14/02* (2013.01); *H04J 14/0227* (2013.01); *H04L 5/006* (2013.01); *H04L 27/2657* (2013.01); *H04L 27/2697* (2013.01); *H04J 14/0224* (2013.01)

(58) Field of Classification Search
USPC ............................................................ 398/79
See application file for complete search history.

(56) References Cited

U.S. PATENT DOCUMENTS

| | | | |
|---|---|---|---|
| 8,571,419 B2 * | 10/2013 | Bouda ................ | H04J 14/0212 398/196 |
| 2009/0074416 A1 * | 3/2009 | Ellis ...................... | H04B 10/50 398/79 |
| 2010/0254484 A1 * | 10/2010 | Hamaguchi ........... | H04L 5/0007 375/295 |
| 2012/0251101 A1 | 10/2012 | McNicol et al. | |

(Continued)

OTHER PUBLICATIONS

Chandrasekhar, OFDM Based Super channel Transmission Technology—Journal of Lightwave Technology, vol. 30, No. 24, Dec. 15, 2012—3816-3817.*

(Continued)

*Primary Examiner* — David Payne
*Assistant Examiner* — Omar S Ismail
(74) *Attorney, Agent, or Firm* — Sage Patent Group (57) ABSTRACT

A method of automatically tuning subcarriers of a superchannel transmission. The method comprises determining (71) a received parameter of transmission quality of one or more of the plurality of subcarriers. The method further comprises tuning (72) a frequency of the one or more subcarrier based on the determined parameter of the transmission quality.

15 Claims, 8 Drawing Sheets

(56) References Cited

U.S. PATENT DOCUMENTS

| | | | |
|---|---|---|---|
| 2013/0058648 A1* | 3/2013 | Ji | H04J 14/0221 398/38 |
| 2013/0058650 A1 | 3/2013 | Bouda | |
| 2014/0294381 A1* | 10/2014 | McNicol | H04J 14/0224 398/34 |
| 2014/0363164 A1* | 12/2014 | Kim | H04J 14/06 398/65 |

OTHER PUBLICATIONS

Zhou ,400G WDM Transmission on the 50 GHz Grid for Future Optical Networks—Journal of Lightwave Technology, vol. 30, No. 24, Dec. 15, 2012—3781-3789.*

400G WDM Transmission on the 50 GHz Grid for Future Optical Networks by Xiang Zhou et al.; Journal of Lightwave Technology, vol. 30, No. 24, Dec. 15, 2012.

Is Flexi-grid Needed Anymore with Spectrally Efficient Time Frequency Packing Terabit Superchannel Technology? by G. Meloni et al., Jun. 14, 2013.

International Search Report for International application No. PCT/EP2013/067181, dated May 9, 2014.

System Requirements for WSS Filter Shape in Cascaded ROADM Networks by Fred Heismann; OSA/OFC/NFOEC, 2010.

* cited by examiner

METHOD AND APPARATUS FOR SUPERCHANNEL TUNING

PRIORITY

This nonprovisional application is a U.S. National Stage Filing under 35 U.S.C. § 371 of International Patent Application Serial No. PCT/EP2013/067181, filed Aug. 16, 2013, and entitled "A Method and Apparatus For Superchannel Tuning".

TECHNICAL FIELD

Aspects of the invention relate to a method and apparatus for superchannel tuning.

BACKGROUND

Known optical telecommunication networks operate using Wavelength Division Multiplexing (WDM). To increase the total capacity towards higher line rates, e.g. transporting 400 Gb/s and 1 Tb/s, with higher spectral efficiency, has led to the introduction of the superchannel concept where the line rate is split into multiple subcarriers.

The most common approaches to implement superchannels are based on orthogonal signaling and Nyquist spacing, e.g. Orthogonal frequency-division multiplexing (OFDM) and Nyquist Wavelength Division Multiplexing (WDM). Both require subcarrier phase locking and precise frequency spacing. Therefore these solutions do not fit well with the currently installed networks where nodes comprise a fixed WDM grid e.g. with 50 GHz spacing. For example, the nodes are Reconfigurable Optical Add Drop Multiplexer (ROADMs) or optical cross-connects.

To overcome these difficulties the concept of flex-grid ROADMs is known, comprising a flexible grid for WDM channels. The spectral width of the channels can be tuned (e.g. in 12.5 GHz units) to carry the superchannel. This requires large changes to the network infrastructure.

An alternative approach is the use of higher order Quadrature amplitude modulation (QAM). The high spectral efficiency assists in fitting the subcarriers within the conventional 50 GHz slots. For example, a transmission of 224 Gb/s in a 50 GHz slot has been obtained with 16 QAM modulation. However QAM format is strongly penalized by its poor Optical Signal-to-Noise Ratio (OSNR) sensitivity which leads to poor reach (e.g. around 500 to 800 km).

SUMMARY

A first aspect of the present invention provides a method of automatically tuning subcarriers of a superchannel transmission. The method comprises determining a received parameter of transmission quality of one or more of the plurality of subcarriers. The method further comprises tuning a frequency of the one or more subcarrier based on the determined parameter of the transmission quality.

Thus, the subcarriers of the superchannel are tuned without knowledge of a passband through which the subcarriers have been transmitted.

Optionally, the plurality of subcarriers are unevenly spaced.

Thus, the superchannel efficiently fits within a standard grid of passbands having a uniform spacing.

Optionally, the method comprises a first tuning phase in which the parameter of transmission quality cannot be determined for one or more subcarrier, and a second tuning phase comprising the tuning the frequency of the one or more subcarrier based on the determined parameter of the transmission quality.

Thus, the subcarriers are tuned whether or not the initial tuning allows measurement of a parameter of the transmission quality.

A second aspect of the present invention provides an apparatus configured to automatically tune subcarriers of a superchannel transmission. The apparatus comprises a processing unit configured to receive a parameter of transmission quality for a plurality of subcarriers, and command tuning of a frequency of one or more of the subcarriers based on the determined parameter of the transmission quality.

A third aspect of the present invention provides a system configured to automatically tune subcarriers of a superchannel transmission. The system comprises a receiver configured to determine a parameter of transmission quality for a plurality of subcarriers. The system further comprises a transmitter configured to tune a frequency of one or more of the subcarriers based on the determined parameter of the transmission quality.

A fourth aspect of the present invention provides a computer program product configured, when run on a computer, to carry out the method according to any one example of the invention.

BRIEF DESCRIPTION OF THE DRAWINGS

Embodiments of the present invention will now be described, by way of example only, with reference to the accompanying drawings in which.

DETAILED DESCRIPTION

Figure 1:
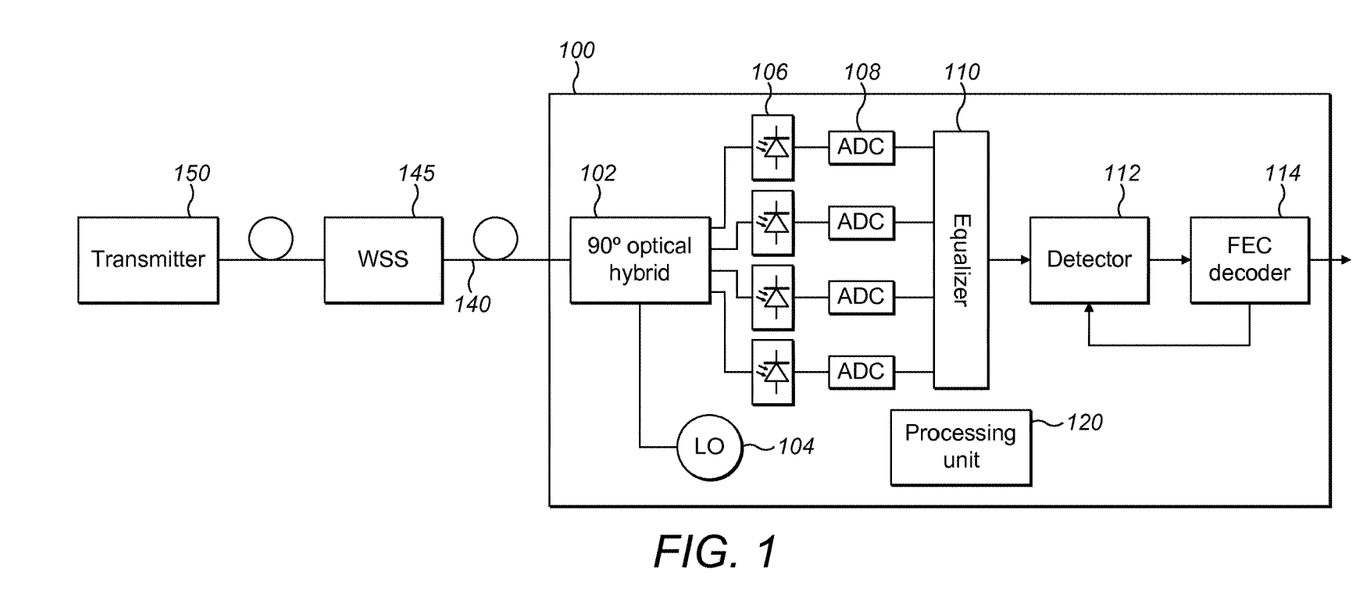
FIG. 1 shows an example network comprising a receiver and transmitter according to an aspect of the invention.

FIG. 1 shows an apparatus according to an example of the invention. In some aspects, the apparatus is a receiver 100. The receiver 100 is configured to receive a superchannel transmission comprising a plurality of sub-carriers. The superchannel is received over an optical link 140, e.g. an optical fiber.

The superchannel transmission is transmitted by a transmitter 150. The transmitter 150 comprises one or more lasers (not shown) to generate the subcarriers (sub-channels). In some examples, the transmitter 150 comprises one laser for each subcarrier. The subcarriers are modulated by the transmitter 150, e.g. with Mach-Zehnder modulators. The frequency of the lasers can be tuned based on a signal received from the receiver 100.

The link 140 comprises, in this example, one or more wavelength selective switches (WSS) 145. The WSS 145 may be in a ROADM. The WSS 145 is arranged to optically switch the subcarriers as a wavelength.

The receiver is arranged to receive all of the subcarriers of the superchannel. At least some of the components of the receiver now described are arranged to receive one of said subcarriers. In some examples, the receiver 100 comprises a plurality of sets of such components (optionally termed receiver units), to receive all the subcarriers.

The receiver 100 comprises a 90 degree optical hybrid 102 configured to receive the coherent transmission. A local oscillator 104 is connected to the 90 degree optical hybrid 102. The 90 degree optical hybrid 102 provides an output to four balanced photo-detectors 106 (e.g. photodiodes). For each sub-carrier, the photo-detected signals at the output of the four photo-detectors 106 (two for each polarization) are sampled and digitized by four analog-to-digital converters (ADC) 108.

The digitized signal is then digitally processed. For example, the digital processing comprises an Equalizer 110, e.g. a 2-D Feed Forward Equalizer (FFE). The FFE 110 provides an output to a detector 112, connected to a Forward Error Correction (FEC) decoder 114. For example, the decoder 114 outputs soft information. In this example, there is an optional iterative link between the detector 112 and decoder 114. The decoder 114 is configured to output decoded bits of the transmission.

In some examples, the receiver 100 further comprises a processing unit 120 configured to process information to obtain the automatic tuning according to aspects of the present invention. The processing unit 120 is further configured to output signals for transmission to the transmitter 150, in order to tune the sub-carrier frequencies. In some examples, the output of the processing unit may be commands for the transmitter to transmit the subcarriers on one or more particular frequencies.

The processing unit 120 is connected to any part of the receiver 100 to carry out the functions described. The processing unit 120 is common to a plurality of the subcarriers, and in some examples, is common to all of the subcarriers. The processing unit may be in the receiver, a transceiver comprising the receiver, or in a management module connected to one or more receivers. In some examples, at least a part of the processing unit is remote from the receiver. In some aspects, at least a part of the processing unit is located with the transmitter. In some examples, the processing unit is split into a plurality of processing units, which may be at the same or different locations, and which may each carry out one or more functions of examples of the invention.

Figure 2:
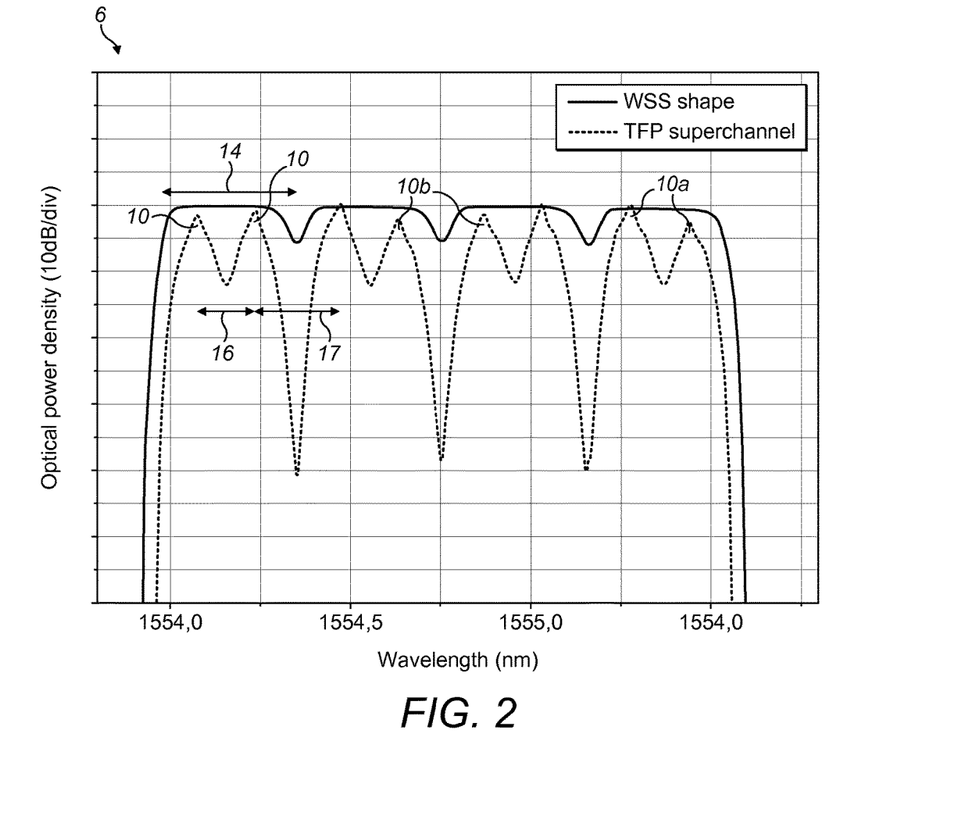
FIG. 2 shows an example superchannel spectrum according to an aspect of the invention.

FIG. 2 shows a superchannel 6 comprising a plurality of sub-channels. The sub-channels may be equivalently considered as subcarriers 10. The subcarriers 10 are multiple coherent carriers which are combined to create an aggregate superchannel of a higher data rate. In some examples, the subcarriers are digitally combined. The aggregate channel may be received on a single high-density line card, e.g. that can be deployed in one operational cycle. The superchannel may be referred to as a Dense Wavelength Division Multiplexing (DWDM) superchannel. The superchannel subcarriers do not require a guard band between them.

The transmission uses a digital multi-carrier modulation method. A large number of closely spaced subcarrier signals are arranged to carry data on a plurality of parallel data sub-channels. The data may be encoded with forward error correction (FEC).

The superchannel 6 is frequency packed. The frequency packing allocates more FDM subcarriers within a given frequency range than the orthogonal requirement. The frequency packing provides an increased spectral efficiency. The receiver is configured to recover the resulting inter carrier interference (ICI). In some example, the frequency packing is based on a faster than Nyquist signaling (e.g. using Quadrature phase-shift keying (QPSK)). The subcarriers 10 are not constrained to be orthogonal. This allows the frequency of the subcarriers 10 to be selected independently of the requirement for orthogonality.

FIG. 2 illustrates how a frequency packed superchannel is tuned into a conventional grid slot 14, e.g. a grid slot of a Wavelength Selective Switching (WSS) node. The WSS node is arranged to filter a signal into channels according to the grid slots 14, e.g. for switching. The channel spacing of the slot 14 in this example is 50 GHz. The slot 14 may also be referred to as a passband 14. The tuning method comprises tuning at least some of the subcarriers of the superchannel within the passband 14.

The subcarriers 10 of the superchannel 6 are unevenly spaced. The spacing of the subcarriers 10 of the superchannel 6 comprise a plurality of different frequency spacings. In this example, a plurality of subcarriers 10 are located in a plurality of slots 14. For example, two subcarriers 10 are in each of a plurality of slots 14, e.g. in four slots 14 as shown. The subcarriers 10 within a slot 14 have a first spacing 16, e.g. 20 GHz. The adjacent subcarriers in different slots 14 have a second spacing 17, e.g. 30 GHz. The first spacing 16 is smaller than the second spacing 17. The sum of the first spacing(s) 16 of the subcarriers 10 within a slot and the second spacing 17 to an adjacent subcarrier in another slot is approximately equal to the size (bandwidth) of the grid slots 14, and in some examples, is equal to the size of the grid slots 14.

In some examples, a grid slot 14 comprises more than two subcarriers 10. Each subcarrier within a grid slot 14 is spaced apart by a same first spacing 16, or a different first spacing. In this case, the total of the first spacing 16 of the subcarriers 10 within a slot and the second spacing 17 to an adjacent subcarrier in another slot is approximately equal to the size of the grid slots 14.

The different spacing between adjacent subcarriers 10 allows the subcarriers 10 to fit within a passband of the grid slot channels. This allows conventional WSS technology with a fixed grid slot, e.g. as defined by the ITU-T, to be used without requiring a flex-grid. The different first and second spacing 16,17 are allowed by using frequency packing. The combined effect of narrowband filtering and sub-carriers independence allow for this superchannel structure. In some examples, two 35 to 40 Gbaud QPSK wavelengths are tuned within a 50 GHz grid slot. This is of benefit for network operators because the already installed network can be used to obtain an increase in capacity. In some examples, QPSK modulation is used which allows for long haul reaches (>1500 Km). For example, the communications link is a 20×20 dB link with 10 WSSs and 35 Gbaud subcarriers.

In some examples, the superchannel has a rate of greater than 1 Tb/s, on a 200 GHz spectrum with a spectral efficiency of 5 b/s/Hz or more. In some examples, the superchannel is both Time and Frequency packed. The time packing, allowing some inter-symbol interference (ISI), allows even more capacity in a slot 14.

In a real system, each WSS in a chain of ROADM may exhibit deviations from the ideal scenario. For example, the WSS passband transfer function (i.e. slot 14) may not be aligned with the ITU-T defined frequency grid, or may exhibit asymmetric shapes. The passband may be defined by bandwidth and center frequency (e.g. for a flexgrid) or by the passband center frequency alone (e.g. for a fixed bandwidth of passband). A signal being passed through a plurality of optical switches may result in a reduced total bandwidth and a misalignment in position.

It is not possible to know a priori the actual equivalent passband shape and position. Existing WSSs technology does not allow for tuning of the passband. In addition, transceiver lasers of the nodes (e.g. transmitter 150) are usually calibrated at the center frequency only. As a result, a nominal subcarrier frequency tuning will be not be optimal and centered within a link pass-band transfer function. This can cause high penalties, or even system outage.

An aspect of the present invention is to automatically optimize the subcarrier position and/or spacing. An accurate position and/or spacing allows capacity to be maximized, and/or avoids the need for additional margins to be introduced. Aspect of the invention relate to automatic tuning of the wavelengths of the subcarriers 10. The tuning is arranged to maximize the performance by getting feedback from the receiver. The tuning optimizes the transmission performance for the communications link, e.g. including one or more passbands, e.g. including one or more passbands in a WSS.

Figure 3A:
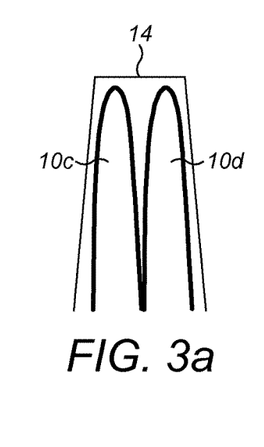
FIGS. 3a to 3e shows examples of subcarrier alignments within a passband according to an aspect of the invention.

FIGS. 3a to 3e show examples of a first subcarrier 10c and a second subcarrier 10d in relation to a channel grid slot 14. FIG. 3a shows a good alignment, and FIGS. 3b to 3e show examples of misalignment.

FIG. 3a shows a correct tuning of the subcarriers 10c,10d within the slot 14. Both subcarriers 10c,10d are fully within the passband of the slot 14. The position of the subcarriers 10c,10d and spacing between the subcarriers 10c,10d is optimal.

Figure 3B:
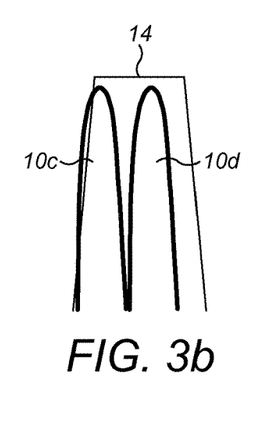

FIG. 3b shows an example where the first subcarrier 10c is misaligned. The first subcarrier 10c is only partially within the slot 14, causing an excessive filtering penalty. The second subcarrier 10d is within the slot 14. The position of the subcarriers 10c,10d is not aligned. The spacing between the subcarriers 10c,10d is correct.

Figure 3C:
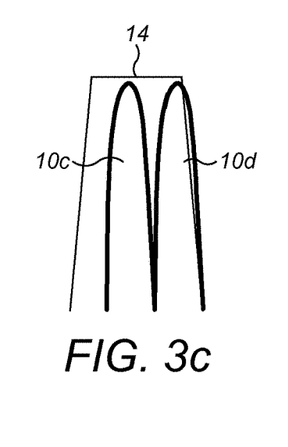

FIG. 3c shows an example where the second subcarrier 10d is misaligned. Similarly to FIG. 3b, the second subcarrier 10d is only partially within the slot 14, causing an excessive filtering penalty. The first subcarrier 10c is within the slot 14. The position of the subcarriers 10c,10d is not aligned. The spacing between the subcarriers 10c,10d is correct.

Figure 3D:
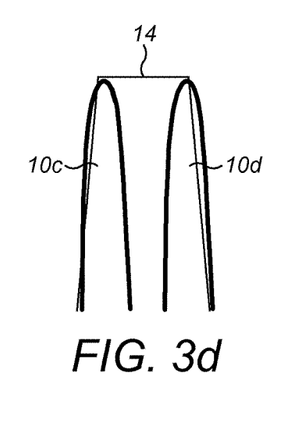

FIG. 3d shows an example where the first and second subcarriers 10c,10d have a spacing which is too large for the slot 14. The first and second subcarriers 10c,10d would suffer a high filtering penalty.

Figure 3E:
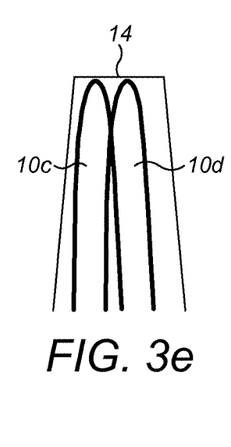

FIG. 3e shows an example where the first and second subcarriers 10c,10d have a spacing which is too small. The first and second subcarriers 10c,10d are too close together. This results in high cross-talk between the subcarriers 10c, 10d.

The tuning method described finds the right tuning (i.e. as shown in FIG. 3a) without knowledge of the link (e.g. passband position and/or width).

An example method of optimizing the tuning comprises one or more of the following steps. In some aspects the method can be considered as comprising a first, or coarse, tuning method (steps 1 to 4) and a second, or fine, tuning method (step 5).

1) Set the subcarriers 10 to be initially at a default value. In some examples, the method comprises setting both (or all) subcarriers are close to the nominal center frequency aligned with the standard grid. In some examples, the subcarriers within a slot are closer together than a standard spacing, e.g. 20 GHz. The relatively close spacing of the subcarriers 10 is arranged to provide a filtering-penalty free condition.

The close spacing of the subcarriers may result in a sub-optimal performance due to cross-talk, which can be improved by the subsequent steps. In some examples, the subcarriers 10 of a passband are nominally set at the center frequency of the passband. In an alternative example, the subcarriers 10 of a passband are set nominally with a pre-determined spacing. In some examples, the pre-determined spacing is smaller than the nominal or expected spacing.

2) The spacing of subcarriers 10 within a passband or slot channel is increased until at least one subcarrier starts working. The at least one working subcarrier provides performance feedback, e.g. OSNR, BER.

3) If only one subcarrier 10 is not working (or only some of the plurality of subcarriers 10 are not working), the plurality of subcarriers 10 within a slot 14 are translated, i.e. frequency shifted. The translation of all the subcarriers 10 in a passband is in a same direction. The direction is from the non-operating subcarrier(s) towards the operating subcarrier(s). The operating sub-carriers are also translated in the same direction. The translation direction can alternatively be considered as the non-operating subcarrier is translated towards the center frequency of the passband 14.

The method determines that if not all (e.g. only one) of the subcarriers are operational, the subcarriers are determined not be symmetric with respect to the passband. The operational subcarrier(s) is closer to the center frequency of the passband. This provides a determination of the position of the center frequency relative to the subcarriers. Thus, the subcarriers are translated in the appropriate direction, i.e. to be symmetric within the passband.

In some aspects, the direction is from a said subcarrier frequency for which the parameter of transmission quality cannot be determined to a subcarrier frequency providing the parameter of the transmission quality. The relative frequency provides a translation to a higher frequency or a lower frequency. The direction higher or lower accords with the relative position (higher or lower) of the working subcarrier, i.e. the subcarrier for which the parameter of transmission can be determined.

4) Steps 2 and 3 can be re-iterated until both subcarriers are in an operating configuration. Steps 1 to 4 may be considered as coarse initial adjustments to quickly drive the superchannel close to the optimal condition.

5) In a fine tuning method, a performance of at least one of the subcarriers 10 is recorded. For example, the performance (e.g. OSNR, BER) is measured in the receiver. In some examples, the performance of the subcarriers is recorded by the equalizer, detector or decoder. For example, the performance may be determined in a DSP. In some examples, the equalizer, detector and decoder are implemented in a DSP.

The performance of at least one of the subcarriers 10 is analyzed to determine the optimal position and/or spacing. For example, the performance is input into one or more algorithms, which will be described in more detail below. The algorithm is used to fine tune the frequency of the subcarriers. For example, the algorithm used is a convex optimization method. The convex optimization method requires that an objective function is to be minimized. For example, the objective function is a parameter of the transmission quality (e.g. based on SNR or BER) which can be minimized. For a parameter such as SNR where a high value indicates a high performance, the objection function may determine a maximum or determine a minimum of the negative of SNR (i.e. —SNR).

The coarse tuning phase is optional. For example, if the initial tuning is reasonable, e.g. all subcarriers of a passband have a measurable transmission quality, only the fine tuning phase is carried out. Alternatively, a further aspect of the method comprises only the coarse tuning phase.

In some examples, the optimization algorithm requires a relatively precise evaluation of the frequency of the subcarrier, at least relative to a center frequency of the passband or to a previous frequency of the subcarrier. In some examples, the optimization algorithm requires a gradient of the objective function. The objective function is a parameter of the transmission quality based on the frequency of the subcarriers 10. The gradient of the objective function is indicated by a change of the parameter of the transmission quality with the frequency of the plurality of subcarriers 10.

The following steps are carried out to evaluate the optimization algorithm, to fine tune the subcarrier frequency. One or more of the following steps are carried out in the processing unit 120 of the receiver and/or at a remote processing unit:

a) Determine the frequency step. The transmitter is configured to provide a plurality of frequencies for one or more of the subcarriers, in order to obtain the optimal frequency. In some examples, the plurality of frequencies vary in steps. The transmission frequency during the optimization, e.g. at each step, needs to be determined. If a laser characteristic-curve is calibrated, then the transmission frequency will be known, and no estimation is required. Otherwise, an estimation of the transmission frequency is carried out by the receiver. For example, the estimation is done by reading the frequency offset estimation. The frequency offset estimation is carried out by the receiver, e.g. in the DSP. The frequency offset estimation is carried out in the digital domain. The frequency offset estimation is the estimation of the offset between the incoming signal frequency and the local oscillator frequency. The frequency offset estimation is used to determine a change in subcarrier frequency during tuning, as will be described in more detail below.

b) Tune a local oscillator (LO) to recover the frequency offset. This is required to track the LO together with the transmission frequency, e.g. transmission laser. The local oscillator signal is fed to the 90 degree optical hybrid of the receiver. Alternatively, the LO is not tuned to the incoming signal, and only the frequency offset estimation in the digital domain is used.

c) Evaluate the objective function at the receiver for a plurality of frequencies of one or more of the subcarriers. For example, the objection function is a minimum of the performances of each of the subcarriers within a particular slot or passband 14. This may be written as Fobj: min (performance (f1) ... performance (fn)), for n subcarriers f within a passband. The objective function may be evaluated using a parameter of the transmission quality (i.e. performance) of the sub-carriers received by the processing unit 120.

d) Apply in turn a proper correction to the frequencies to improve the objective function by applying a converging method (e.g. convex optimization) and using the frequency step estimated in step a). The receiver 100 comprises the processing unit 120 configured to signal the transmitter to vary the sub-carrier frequency. In some examples, the subcarrier frequencies are each tuned to a plurality of different frequencies, and each subcarrier frequency combination for a passband has a performance measured. Once all frequencies within a range have been tested, the optimal frequencies are then determined by the objective function. Alternatively, the objective function is assessed after each frequency step.

After the objective function has been determined for all frequencies, or all frequencies within a range, the optimal frequency is selected. Alternatively, the subcarrier frequencies are tuned to a plurality of frequencies, and the objective function determined after each frequency step. The method is stopped once it is determined that the optimal frequencies have been determined.

e) Steps a) to d) are repeated until a convergence condition is verified. The convergence condition is expected due to the convex nature of the Objective function.

In the event that optimization is considered to be needed, the optimization method can be restarted from step 2) or step 1). For example, optimization may be needed due to a frequency drift or after a path re-routing. The need for optimization may be determined if a threshold is exceeded.

The performance feedback may be determined by any suitable method, for example, by the receiver. In some examples, the performance feedback can come from the pre-FEC BER estimation at the receiver or from digital monitoring information from the DSP (e.g. OSNR)

In this way, the optimal configuration of the subcarriers 10 is found. This optimization allows for designs which do not need to include a margin for the penalty from the misalignment to the central frequency or the penalty due to laser setting accuracy.

The optimal tuning of the subcarrier frequencies comprises finding the frequencies that maximize the performances of the subcarriers 10. The fine tuning method comprises changing the frequencies of the subcarriers at the transmitter. Any known method of changing the frequencies of the transmitter may be used. In some examples, the subcarriers are provided by one or more lasers. The laser frequency may be tuned by controlling software. For example, the laser is tuned with a thermal control.

Figure 4:
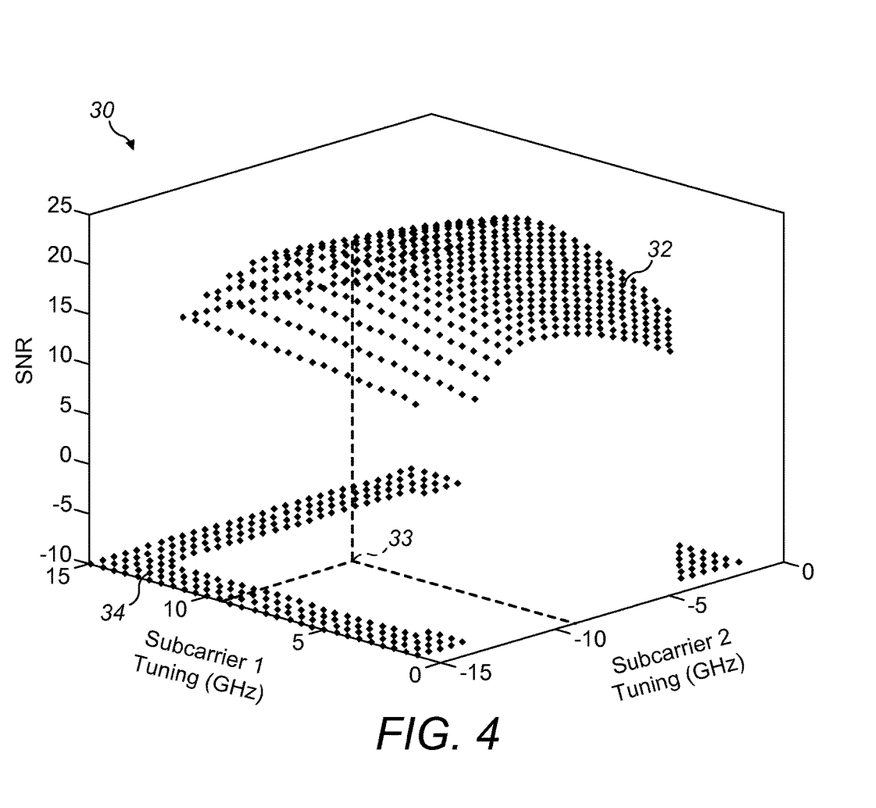
FIG. 4 shows a graph illustrating a variation in subcarrier performances with tuning according to an aspect of the invention.

FIG. 4 shows a graph 30 showing subcarrier performances (e.g. SNR including filtering penalties and cross-talk penalties) as a function of the tuning of the plurality of subcarriers 10. The vertical axis indicates the worst of the subcarrier performances, with a higher performance (e.g. higher SNR) shown as higher on the vertical axis. The subcarrier tunings are shown relative to a center frequency of the passband.

FIG. 4 shows a first region 32 where both subcarriers operate to provide performance feedback (e.g. SNR). This first region 32 is convex, presenting a performance maximum associated with the optimal tuning. The example in the graph shows an optimal frequency tuning 33 at +9 GHz and −9 GHz with respect to the slot center frequency.

The graph 30 shows a second region 34 where at least one of the subcarriers 10 does not work, i.e. the SNR is too low. Such subcarrier tunings in region 32 cannot provide feedback, and are shown on the graph floor. At least one of the subcarrier 10 is out of traffic.

The automatic tuning method according to an aspect of the invention is configured to operate from an initial tuning in either of the first and second region 32,34.

When feedback is available (i.e. in the first region 32), the optimization of an aspect of the evaluation is evaluated with a convex optimization method. The method is arranged to operate on a proper objective function based on the receiver feedback. The objective function cannot be unique. The performance is information provided by the receiver, e.g. SNR or BER. The optimization method is based on the gradient of the performance with the subcarrier frequency.

When no feedback is available (i.e. in the second region 34), examples of the invention define optimization steps.

If only one of the lowest or highest subcarriers in a slot is not working initially, then the method determines that subcarriers are not centered, e.g. as shown in FIGS. 3b and 3c. The method determines the frequencies should be translated in a direction based on the operating subcarrier(s). All subcarriers within the slot are moved in the same direction. The direction is such that the frequencies are increased if the operating subcarrier is the higher frequency subcarrier, or decreased if the frequency of the operating subcarrier is the lower frequency subcarrier. The operating subcarrier(s) sets the direction. The direction is based on the relative frequency between an operating subcarrier and non-operating subcarrier in the slot. In some aspects, the direction is from a said subcarrier for which the parameter of transmission quality cannot be determined to a subcarrier providing the parameter of the transmission quality. Therefore, knowledge of the slot passband is not required in order to tune the subcarrier frequencies within the passband.

If both (or all) subcarriers are out of traffic initially, then the method determines the situation shown in FIG. 3d or 3e. This can be checked by tries. In some examples, if no initial condition is set and there is ambiguity in the position of the subcarriers, examples of the method determine if the problem is filtering or cross-talk. For example, performance at a plurality of different frequency positions and/or spacing is measured to obtain at least one operating subcarrier.

In some examples, ambiguity of the problem causing non-operation of the subcarriers is avoided by starting the optimization method from a known condition. For example, starting with close and centered subcarriers (e.g. as shown in FIG. 3e). The frequency spacing of the subcarriers 10 is then increased until one or both subcarriers operates. In this case, any ambiguity on what resulted in the subcarriers not functioning is overcome.

Optimization method parameters, e.g. step depth of the optimization or the convergence threshold, may be selected to provide for a relatively accurate tuning in a relatively short number of steps.

Figure 5:
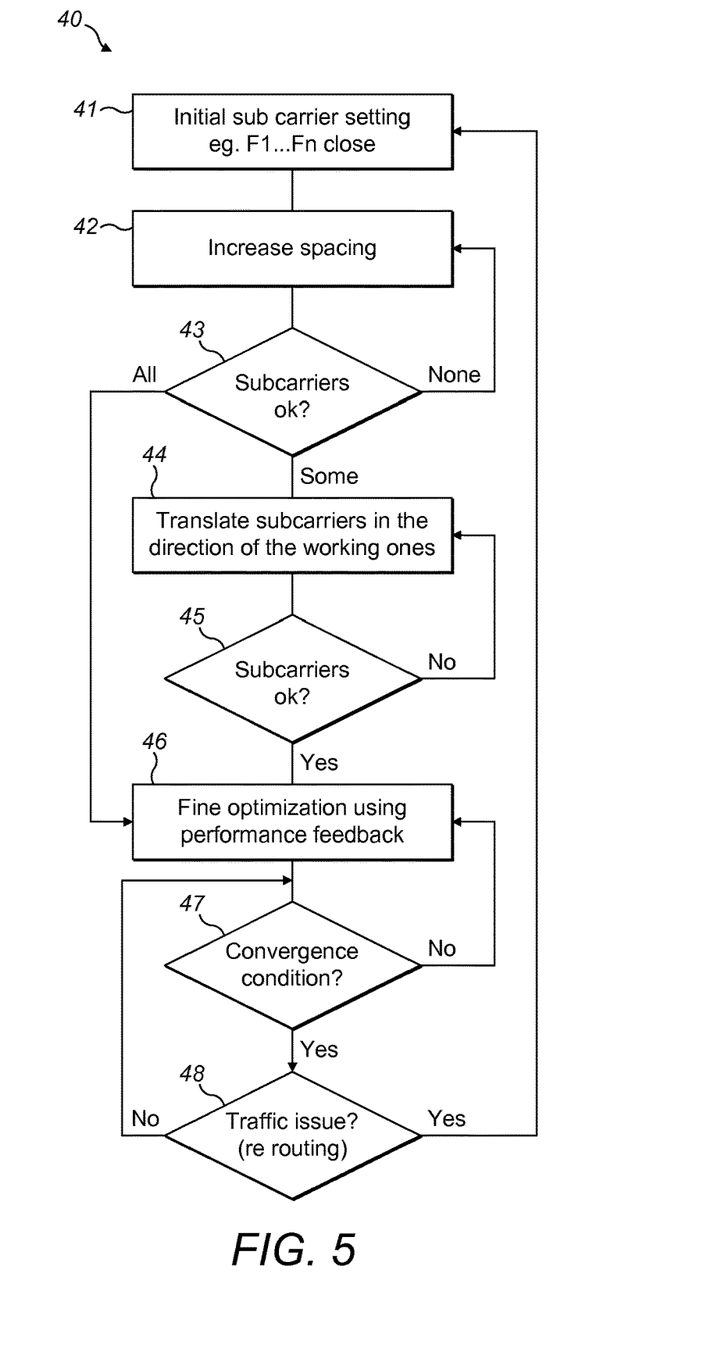
FIG. 5 shows an example method according to an aspect of the invention.

FIG. 5 illustrates a method 40 according to an example of the invention. In 41, a coarse tuning is started by initially setting the subcarrier frequencies relatively close together. This ensures that the subcarriers 10 do not have a filtering penalty.

In 42, the spacing of the subcarriers 10 is increased. In 43, the operation of each of the subcarriers 10 is assessed. A determination is made of whether all, some or none of the subcarriers are operational, i.e. able to provide a parameter of performance.

If none of the subcarriers 10 are determined to be operational, the method returns to 42, and the subcarrier spacing is further increased. The subcarrier spacing is increased until at least one of the subcarriers is operational.

If only some of the subcarriers 10 are determined to be operational, the method continues in 44 with a translation of the subcarriers 10. The translation in frequency is in a direction indicated by the operational subcarrier(s). The direction is arranged to translate the non-operational subcarrier(s) towards the operational subcarrier(s). In some examples, the spacing of the subcarriers is maintained in the translation, such that the operational subcarrier(s) is also translated in the same direction and by the same amount.

Following from the translation, in 45 a determination is made of whether all of the subcarriers are now operational. If not all the subcarriers are operational, the translation 44 is repeated. If the subcarriers are all operational, the method continues with a fine optimization in 46.

If all of the subcarriers 10 are determined to be operational in step 43, the method also continues in 46 with the fine optimization.

In 46, the fine optimization of the tuning comprises using performance feedback, i.e. a measurement of the transmission quality. The performance is determined in the receiver, and feedback provided to determine the optimal tuning. For example, the feedback is provided by the convex optimization method. A step frequency of the subcarriers is determined by the receiver, for example, from the offset of the local oscillator.

In 47, the method determines if a convergence condition has been reached. For example, the convergence condition is the optimal tuning. Alternatively or in addition, the convergence condition is a performance threshold. The measured performance of all subcarriers is required to exceed the threshold for the tuning to be considered as optimal (or as a minimum for a feasible connection). If the convergence condition is not yet reached, the method continues with a further fine optimization. In particular, the subcarrier frequencies are varied until the optimal performance is obtained.

Once the fine optimization has been completed, the subcarriers 10 are used for carrying traffic as part of a communications link. In some examples, the traffic and/or performance is continually checked in 48 to consider whether the subcarriers are still at an optimal tuning. If there are no major traffic issues, e.g. each subcarrier is carrying traffic, the method may continue by checking whether the convergence condition is still present. If it is, no further optimization is required. If the subcarriers are not in the convergence condition, then the fine optimization in 46 is repeated. If traffic issues are detected in 48, e.g. one or more of the subcarriers 10 is not functioning, the coarse and fine optimization is repeated. For example, the method continues at 41.

Alternatively, once the fine optimization has been completed in 47, no further optimization or checking steps are carried out, and the method ends.

Figure 6A:
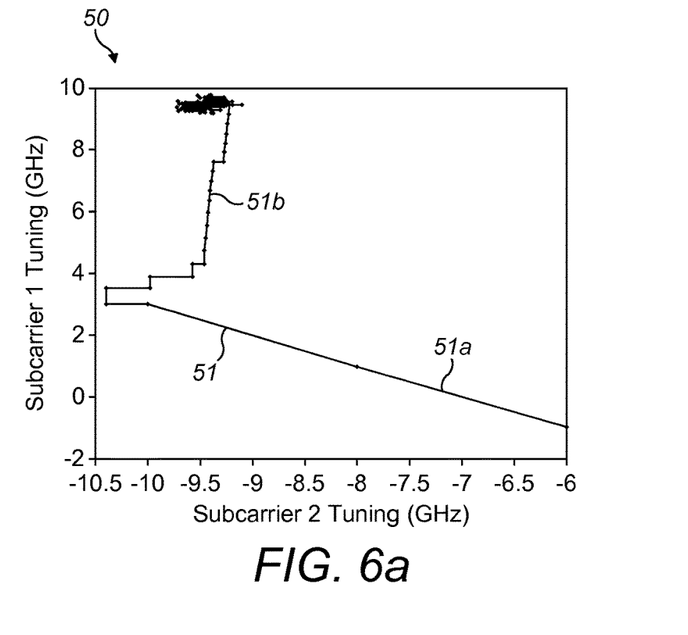
FIGS. 6a and 6b show examples of the tuning results according to an aspect of the invention.
Figure 6B:
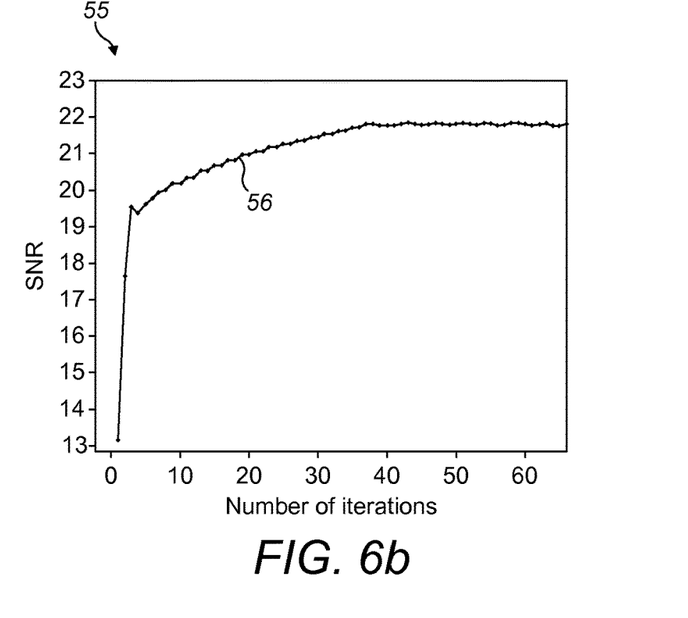

FIGS. 6a and 6b show example results of the method according to an aspect of the invention.

FIG. 6a shows a plot 50 of the tuning 51 of a first subcarrier (subcarrier 1) against a tuning of a second subcarrier (subcarrier 2). The units are frequency offset from a center frequency of the passband 14.

The first subcarrier frequency is shown initially at −1 GHz. The second subcarrier frequency is shown initially at −6 GHz. The coarse tuning method steps are carried out in region 51a, which changes the first subcarrier frequency to around 3 GHz, and the second subcarrier frequency to around −10 GHz. This coarse tuning provides a fast correction. This is shown to improve the performance.

The fine tuning method steps are then carried out in region 51b, which changes the first subcarrier frequency to around 9.5 GHz, and the second subcarrier frequency to around −9.5 GHz. The subcarrier performance 51 is shown to further increase during the fine tuning. The fine tuning is based on convex optimization. Thus, the subcarrier frequencies are tuned within the passband, without knowledge of the passband. The optimization is carried out only with a determination of transmission quality at the receiver.

FIG. 6b shows a plot 55 of the subcarrier performance (e.g. SNR) 56 (arbitrary units on the vertical axis) against a number of iterations in the optimization method. The iterations include the initial iterations of the coarse tuning and the further iterations of the fine tuning. The performance (e.g.

SNR) is shown to improve rapidly in only a few steps, followed by a more gradual improvement.

Figure 7:
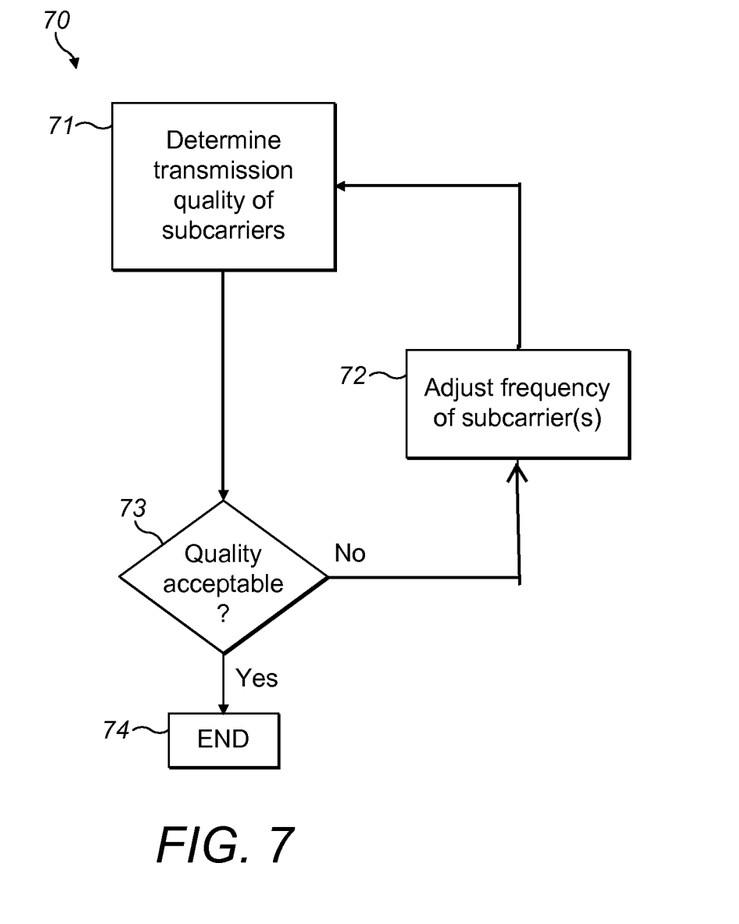
FIG. 7 shows an example method according to a further aspect of the invention.

FIG. 7 shows a method 70 of an overview aspect of the invention. In the method 70, a parameter of transmission quality is determined in 71. For example, the parameter may be e.g. BER, SNR. The transmission quality is determined at the receiver. In some aspects, the method determines if no transmission quality can be measured, e.g. if the subcarrier is non-operative.

The method determines if the parameter of transmission quality is acceptable in 73. The transmission quality may be determined to be acceptable if it is over (or under) a threshold, or if the transmission quality is determined to be optimal, e.g. by a function.

According to the determined transmission quality, the frequency of one or more subcarriers is changed in 72. For example, the subcarriers are set at a pre-determined frequency, the spacing is increased, the frequencies are translated, or one or more frequencies are changed in steps to determine an optimal frequency. In some aspects, the subcarriers in a passband are optimized independently of the subcarriers in another passband.

If the transmission quality is acceptable, the frequencies are set and the optimization method ends. If the transmission quality is not yet acceptable, the automatic tuning continues by iterating the measurements of the transmission quality and adjusting the frequency.

Figure 8:
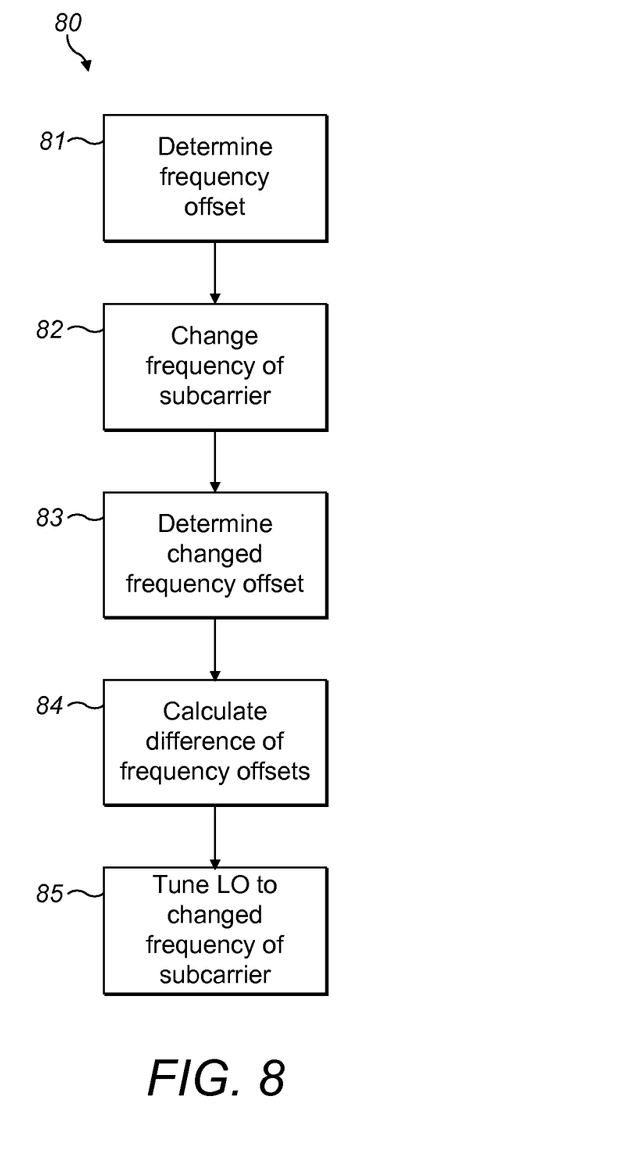
FIG. 8 shows an example method according to another aspect of the invention.

FIG. 8 shows a method 80 according to an aspect of the invention. In order to apply the optimization method it is important to evaluate correctly the frequency steps applied to the subcarriers. In some examples, if the frequency step is not accurate, optimization based on the gradient (like the convex optimization methods) may be inaccurate and the algorithm could not converge or oscillate. Transceiver lasers are typically calibrated only at the center ITU-T frequency, so a direct accurate frequency setting may not be available.

In an aspect of the invention, the frequency step for optimization is determined from feedback from a Frequency Offset Compensator, e.g. at the receiver DSP. The frequency offset estimation is saved in 81 before applying the frequency step in 82. As part of the optimization, the processing unit 120 commands one or more of the transmitter laser to transmit the subcarrier on a changed frequency, i.e. make a frequency step. After the frequency step is applied to the transmitter, the Frequency Offset Compensator again determines the frequency offset, in 83. The difference of the new frequency offset estimation to the saved previous value is calculated in 84. The difference provides an accurate applied step.

The local oscillator at the coherent receiver is tuned to cancel the frequency offset so that LO and transmitter lasers continue tracking each other during the tuning. The LO is only tuned to the altered subcarrier frequency after the Frequency Offset Compensator has determined the frequency offset, in 85. Therefore, the LO is at a constant frequency for both a previous subcarrier frequency, and a subsequent subcarrier frequency. The constant LO for two (or a plurality) of subcarrier frequencies allows the Frequency Offset Compensator to determine the change in frequency. For example, the difference is calculated between the previous and subsequent subcarrier frequency. The Frequency Offset Compensator is part of the digital processing of the receiver, and so is relatively accurate. The accuracy is in the order of MHz. In some examples, the determined step is used to evaluate the next step (gradient).

The LO is tuned to the changed subcarrier frequency before or after, or at the same time, as the calculation of the difference of the frequency offsets.

Aspects of the invention allow for blindly tuning the subcarrier frequencies without knowledge of the system passband, by getting feedback from the subcarrier receivers. Aspects of the invention utilize a combined objective function that is convex from the interplay of filtering penalties and channel crosstalk. The determined applied frequency step (for example necessary to estimate the gradient) is from the receiver, e.g. from the frequency offset digital compensator at the DSP receiver. Aspects of the invention allow tuning both when one or more subcarriers are not being received, and when all subcarriers are received. The apparatus and method provide a first optimization phase when loss of traffic of one or more subcarriers hinders the use of standard optimization methods, and a second fine tuning phase, when performance feedback from receiver is used together with standard convex optimization algorithms.

Aspects of the present invention provide for stable operation of superchannel, e.g. in a ROADM chain. Aspects provide a practical implementation of Frequency Packing superchannels over existing networks, reducing the requirement to replace infrastructure. In some examples, the superchannel operates at hundreds of Gb/s, and in some examples, 1 Tb/S. The communication link over which the transmission is transmitted has a link optical transfer function. Aspects of the invention relate to tuning within the link optical transfer function, and in particular, at centering the subcarriers in the link optical transfer function. In some aspects, the method according to an aspect of the invention optimizes the subcarrier position with respect to the filter chain passband through which the transmission is received. It is possible that the optimum tuning is not exactly at the aligned with the center of the passband, e.g. if the subcarriers have unequal characteristics.

Aspects of the invention avoid the requirement for flex-grid infrastructure. Instead, the spacing (e.g. uneven spacing) of the subcarriers fits within a regularly spaced grid. In particular, the unequal subcarrier spacing accounts for the guard bands between adjacent passbands. These guard bands are not required by the superchannel, but are present in the communications link, e.g. in the WSSs. The tuning method described avoid time-consuming and difficult manual tuning at start up or network changes. The method provides for self-adjustment after traffic re-routing or after environmental conditions drifts. Aspects of the invention do not require any extra calibration of the transceivers An aspect of the invention is a transmitter configured to receive a signal from the receiver to vary the frequency to tune the sub-carriers. A further aspect of the invention is a system comprising a transmitter and a receiver. The receiver is configured to carry out the optimization method as described. The receiver is arranged to transmit signals such that the transmitter varies the frequency of one or more subcarriers to a different frequency. As such, the receiver may be considered as a transceiver.

An aspect of the invention is a computer program product configured, when run on a computer, to carry out the method as described in any example. For example, the computer program product is run on the processing unit 120, e.g. in the receiver or at least partially remote from the receiver.

In some examples, the transmitter comprises lasers to generate the subcarriers. The subcarriers (e.g. lasers) are arranged to be tuned relatively finely, e.g. by 2 GHz, 1 GHz, 0.5 GHz, or 0.1 GHz steps. The transmitter is arranged to tune the lasers in response to the signal from the receiver. As such, the transmitter may be considered as a transceiver. The transmitter and receiver are in a closed loop for optimization of the subcarrier frequency tuning.

In some examples, the transmission is time packed. The receiver is configured to recover the resulting inter symbol interference (ISI). Alternatively, the transmission is not time packed.

The superchannel has been described as having two subcarriers in a passband 14. Alternatively, superchannel comprise a plurality of subcarriers in a passband 14, e.g. two, three or more. References to two subcarriers may refer to a plurality of subcarriers. Alternatively, only one subcarrier is in a passband 14.

Aspects of the invention have been described as relating to automatic tuning of the sub-carriers. Alternatively, aspects of the invention may separately relate to any feature or combination of features described. For example, an aspect of the invention may relate to the use of a frequency packed superchannel with a uniform, standard, grid having passbands.

Any aspect of any embodiment may be combined with any feature of any other embodiment.

The invention claimed is:

1. A method of automatically tuning subcarriers of a superchannel transmission, the method comprising:
   determining a received parameter of transmission quality of one or more of the plurality of subcarriers, and
   tuning a frequency of the one or more subcarriers, and a frequency spacing of subcarriers, based on the determined parameter of the transmission quality,
   wherein the tuning comprises at least one of:
      translating the frequencies of the plurality of subcarriers in a slot of the transmission, and the translating is in a direction from a subcarrier for which the parameter of transmission quality cannot be determined to a subcarrier providing the parameter of the transmission quality, and
      determining a frequency change of the subcarrier from a frequency offset determination of the receiver, wherein determining the frequency change of the subcarrier comprises determining a first frequency offset for a local oscillator, changing the frequency of the subcarrier, determining a second frequency offset for the local oscillator, and determining the frequency change of the subcarrier as a difference between the first and second frequency offset.

2. The method as claimed in claim 1 wherein a plurality of subcarriers are in a single passband through which the transmission is received.

3. The method as claimed in claim 1 wherein the plurality of subcarriers are unevenly spaced, or, wherein the superchannel is frequency packed, time frequency packed or based on faster than Nyquist signaling.

4. The method as claimed in claim 1 comprising:
   a first tuning Phase in which the parameter of transmission quality cannot be determined for one or more subcarrier, and
   a second tuning phase comprising the tuning the frequency of the one or more subcarrier based on the determined parameter of the transmission quality.

5. The method as claimed in claim 1 wherein the tuning comprises tuning the subcarriers with a frequency spacing which is smaller than a standard spacing, and increasing the frequency spacing until the parameter of transmission quality is determined for one or more subcarrier.

6. The method as claimed in claim 1 wherein a local oscillator of the receiver varies to track a frequency of a said subcarrier only after a frequency offset is determined for that frequency.

7. The method as claimed in claim 1 wherein the tuning comprises changing a frequency of one or more of the subcarriers until the frequency is determined to be an optimal frequency and/or the parameter of transmission quality is beyond a threshold.

8. The method as claimed in claim 1 wherein the receiver is a coherent optical receiver.

9. An apparatus configured to automatically tune subcarriers of a superchannel transmission, the apparatus comprising:
   a processor configured to receive a parameter of transmission quality for a plurality of subcarriers, and command tuning of a frequency of one or more of the subcarriers, and a frequency spacing of subcarriers, based on the determined parameter of the transmission quality,
   wherein the processor is configured to tune the subcarriers by at least one of:
      translating the frequencies of the plurality of subcarriers in a slot of the transmission, and the translating is in a direction from a said subcarrier for which the parameter of transmission quality cannot he determined to a subcarrier providing the parameter of the transmission quality, and
      determining a frequency change of the subcarrier from a frequency offset determination of the apparatus, and wherein in determining the frequency change of the subcarrier, the processor is further configured to:
         determine a first frequency offset for a local oscillator, change the frequency of the subcarrier, determine a second frequency offset for the local oscillator, and determine the frequency change of the subcarrier as a difference between the first and second frequency offset.

10. The apparatus as claimed in claim 9 wherein the processor is configured to operate:
    a first tuning phase in which the parameter of transmission quality cannot be determined for one or more subcarrier, and
    a second tuning phase comprising the tuning the frequency of the one or more subcarrier based on the determined parameter of the transmission quality.

11. The apparatus as claimed in claim 9 Wherein the processor is configured to tune the subcarriers with a frequency spacing which is smaller than a standard spacing, and increasing the frequency spacing until the parameter of transmission quality is determined for one or more subcarrier.

12. The apparatus as claimed in claim 9 wherein a local oscillator of the apparatus is configured to vary to track a frequency of a said subcarrier only after a frequency offset is determined for that frequency.

13. The apparatus as claimed in claim 9 wherein the apparatus is a coherent optical receiver.

14. A system configured to automatically tune subcarriers of a superchannel transmission, the system comprising:
    a receiver configured to determine a parameter of transmission quality for a plurality of subcarriers,
    a transmitter configured to tune a frequency of one or more of the subcarriers, and a frequency spacing of subcarriers, based on the determined parameter of the transmission quality, wherein the tuning comprises at least one of:
- translating the frequencies of the plurality of subcarriers in a slot of the transmission, and the translating is in a direction from a said subcarrier for which the parameter of transmission quality cannot be determined to a subcarrier providing the parameter of the transmission quality, and
- determining a frequency change of the subcarrier from a frequency offset determination of the receiver, wherein determining the frequency change of the subcarrier comprises determining a first frequency offset for a local oscillator, changing the frequency of the subcarrier, determining a second frequency offset for the local oscillator, and determining the frequency change of the subcarrier as a difference between the first and second frequency offset.

15. A computer program product comprising a non-transient machine-readable medium carrying instructions which, when run on a computer, carry out a method comprising automatically tuning subcarriers of a superchannel transmission, the method comprising:

- determining a received parameter of transmission quality of one or more of the plurality of subcarriers, and
- tuning a frequency of the one or more subcarrier, and a frequency spacing of subcarriers, based on the determined parameter of the transmission quality, wherein the tuning comprises at least one of:
- translating the frequencies of the plurality of subcarriers in a slot of the transmission, and the translating is in a direction from a said subcarrier for which the parameter of transmission quality cannot be determined to a subcarrier providing the parameter of the transmission quality, and
- determining a frequency change of the subcarrier from a frequency offset determination of the receiver, wherein determining the frequency change of the subcarrier comprises determining a first frequency offset for a local oscillator, changing the frequency of the subcarrier, determining a second frequency offset for the local oscillator, and determining the frequency change of the subcarrier as a difference between the first and second frequency offset.

* * * * *